United States Patent
Gao et al.

(10) Patent No.: US 7,391,368 B1
(45) Date of Patent: Jun. 24, 2008

(54) DETERMINING THE TIME OF ARRIVAL OF A WIRELESS SIGNAL

(75) Inventors: Zhigang Gao, Richfield, OH (US); Paul Stager, Cuyahoga Falls, OH (US); Bretton Douglas, San Jose, CA (US); Brian Hart, Sunnyvale, CA (US); James Amos, North Canton, OH (US); Yoonill Lee, Medina, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/682,649

(22) Filed: Mar. 6, 2007

(51) Int. Cl.
*G01S 1/24* (2006.01)
(52) U.S. Cl. .................................... 342/387; 342/442
(58) Field of Classification Search ................ 342/387, 342/417, 442–443, 439; 375/142, 147, 150, 375/355
See application file for complete search history.

(56) References Cited

U.S. PATENT DOCUMENTS

| | | |
|---|---|---|
| 4,486,850 A | 12/1984 | Hyatt |
| 5,565,764 A | 10/1996 | Priebe et al. |
| 5,920,278 A | 7/1999 | Tyler et al. |
| 7,030,812 B2 | 4/2006 | Bekritsky et al. |
| 7,184,464 B2 | 2/2007 | Abraham et al. |
| 7,190,712 B2 | 3/2007 | Abraham et al. |

FOREIGN PATENT DOCUMENTS

| | | |
|---|---|---|
| WO | WO 02/058267 | 7/2002 |
| WO | WO 02/058290 | 7/2002 |
| WO | WO 02/058346 | 7/2002 |
| WO | WO 03/100348 | 12/2003 |
| WO | WO 03/107188 | 12/2003 |

OTHER PUBLICATIONS

Tim Cornwell and Alan Bridle. "Deconvolution Tutorial." The National Radio Astronomy Observatory (Charlottesville, Virginia). Nov. 4, 1996. The tutorial is widely distributed, and available online at http://www.cv.nrao.edu/~abridle/deconvol/deconvol.html.

(Continued)

*Primary Examiner*—Dao L Phan
(74) *Attorney, Agent, or Firm*—Tucker Ellis & West LLP

(57) ABSTRACT

In an example embodiment, a time of arrival circuit coupled to a wireless transceiver configured to determine a time of arrival of a wireless signal. The time of arrival circuit is operative to perform a coarse-scale frequency domain correlation of the actual samples with a predetermined ideal sample. The time of arrival circuit determines a maximum coarse correlation coefficient. The time delay circuit is operative to determine a plurality of fine correlation coefficients by interpolating around the peak coarse correlation coefficient. The time of arrival circuit determines a maximum correlation coefficient from the plurality of fine correlation coefficients and a time delay associated with the maximum correlation coefficient, the time of arrival is based on the time delay associated with the maximum correlation coefficient.

20 Claims, 5 Drawing Sheets

OTHER PUBLICATIONS

Eric Weisstein. "Clean Algorithm—from Eric Weisstein's World of Physics." Downloaded on Feb. 14, 2004. Available online at http://scienceworld.wolfram.com/physics/CLEANAlgorithm.html.

"Observing with the MuSiCoS spectropolarimeter: On-line data reduction with ESpRIT." Laboratorie d'Astrophysique de Toulouse (Toulouse France). Downloaded Apr. 22, 2004 and available online at http://webast.ast.obs-mip.fr/magnetisme/pol/esprit.html.

Jean-Francois Donati. "Least-Squares Deconvolution of Stellar Spectra." Laboratoire d'Astrophysique de Toulouse (Toulouse France). Downloaded Apr. 22, 2004 and available online at http://webast.ast.obs-mip.fr/people/donati/multi.html.

J.-F. Donati, M. Semel, B.D. Carter, D.E. Rees, and A.C. Cameron. "Spectropolarimetric Observations of Active Stars." Royal Astronomical Society, Monthly Notices, vol. 291, p. 658, Nov. 1997. Available online at http://webast.ast.obs-mip.fr/people/donati/pub/lsd.html.

"AeroScout WLAN Location System." Downloaded on Nov. 10, 2003 and available online at http://www.bluesoft-inc.com/wlan.asp. Bluesoft, Inc., San Mateo, CA.

"Cognio Announces Breakthrough Location Technology for WLAN Deployments." Downloaded on Nov. 10, 2003 and available online at http://www.cognio.com/pressdetail.asp?itemID=70. Cognio, Inc., Waltham, MA.

"WhereNet Main Page." Downloaded Nov. 10, 2003 and available online from http://www.wherenet.com/. WhereNet, Santa Clara, CA.

DETERMINING THE TIME OF ARRIVAL OF A WIRELESS SIGNAL

BACKGROUND

Use of wireless networks, such as wireless local area networks (WLANs) is becoming widespread. Locating wireless units, such as radios, in a wireless communication system, such as a WLAN enables new and enhanced features, such as location-based services and location-aware management. For example, location based services can be used for assigning the correct closest printer to a wireless unit of a WLAN.

One technique employed for locating wireless units is time difference of arrival (TDOA). TDOA determines the location of a wireless unit based on the time of arrival (TOA) of a signal sent by the wireless clients. For example, the TOAs at N+1 receivers can be employed to locate a wireless unit in N dimensional space. Thus, higher resolution of TOA measurements from the receivers can result in higher accuracy in determining the location of the wireless unit. However, there are factors which can impact the resolution of a TOA measurement at a receiver. For example, the sampling rate of the receiver can affect the accuracy of a TOA measurement. This is because the speed of electromagnetic radiation (e.g. light) is about 1 foot per nanosecond (ft/ns). For example, the resolution of receivers with a sampling rate of 40, 80 and 120 MHz are ±12.5, ±6.25 and ±4.2 ns respectively (in time) or ±12.5, ±6.25 and ±4.2 feet respectively. Multipath is another factor that can impact TOA measurement. In a multipath environment, a receiver may receive a line-of-site (LOS) signal and at least one non-line-of site (NLOS) signals, thus the receiver has to select the correct line of site signal.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example embodiment, a time of arrival circuit coupled to a wireless transceiver configured to determine a time of arrival of a wireless signal. The time of arrival circuit is operative to perform a coarse-scale frequency domain correlation of the actual samples with a predetermined ideal sample. The time of arrival circuit determines a maximum coarse correlation coefficient. The time delay circuit is operative to determine a plurality of fine correlation coefficients by interpolating around the peak coarse correlation coefficient. The time of arrival circuit determines a maximum correlation coefficient from the plurality of fine correlation coefficients and a time delay associated with the maximum correlation coefficient, the time of arrival is based on the time delay associated with the maximum correlation coefficient.

In an example embodiment, there is disclosed herein a method for determining the time of arrival of a wireless signal. The method comprises performing a coarse-scale frequency domain correlation of the actual samples with a predetermined ideal sample. A maximum coarse correlation coefficient is determined. A plurality of fine correlation coefficients are acquired by interpolating around the maximum coarse correlation coefficient A maximum correlation coefficient is determined from the plurality of fine correlation coefficients. The time of arrival is based on a time delay associated with the maximum correlation coefficient.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate examples of the present invention, and together with the description serve to explain the principles of the invention.

DESCRIPTION OF EXAMPLE EMBODIMENTS

Figure 1:
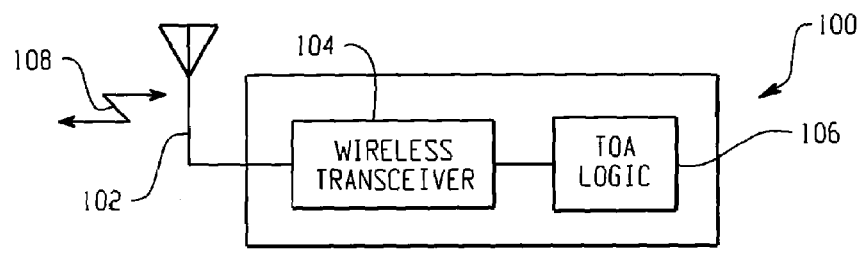
FIG. 1 is an example of a wireless transceiver configured to determine time of arrival of a wireless signal.

This description provides examples not intended to limit the scope of the invention, as claimed. The figures generally indicate the features of the examples, where it is understood and appreciated that like reference numerals are used to refer to like elements.

In an example embodiment, a time of arrival algorithm provides a fine resolution time stamp adjustment to a coarse resolution time stamp corresponding to a known signal within a received signal containing multiple time delayed versions of the known signal. The fine resolution adjustment provides the relative delay of the LOS (line-of-site) component within the received signal. In an example embodiment, the algorithm implements the following:

Successive cancellation of time delayed known signals from the received signal.

Performing coarse correlation calculations.

Detecting threshold for peaks in the correlation calculations.

Refining the coarse correlation calculation using polynomial interpolations.

Adaptively setting a detection threshold for peaks in the correlation calculations.

Adjusting the search range of the time stamp adjustment.

Measuring the relative dominance of a peak in the correlation calculation.

Using the dominance measure for setting the fine resolution time stamp adjustment.

Adjusting the algorithm stop condition.

Performing a series of coarse to fine refinements of correlation calculations.

In an example embodiment, a Fine resolution frequency domain correlation with successive cancellation (FR-FDC_SC) is used to refine the coarse time stamp obtained in the BB (baseband) processor. The coarse time stamp is the result of time domain correlation to identify the SFD (start field delimiter) field or LS (long symbol). This coarse time stamp will generally correspond to the strongest multipath, not necessarily the LOS, component with an accuracy equal to the ADC (analog to digital converter) sample rate. The FRFDC_SC algorithm corrects the coarse time stamp to correspond to the first significant multipath component with a finer resolution than the ADC sample rate.

A received frequency domain signal $\underline{R}$ is correlated against an ideal frequency domain vector $\underline{S}$, both of length N. Successive cancellation refers to removing the energy at a certain time delay from the received signal at each iteration. The correlation between the received and ideal samples as a function of the relative delay $\tau$ at successive cancellation index k is $$\rho^k(\tau) = \frac{\langle \underline{R}^k, \underline{S}.*\underline{Q}(\tau)\rangle}{\|\underline{R}^k\| \cdot \|\underline{S}\|} \qquad \text{Equation 1}$$

Where the inner product is defined by $$\langle \underline{x},\underline{y}\rangle = \underline{x}^H \cdot \underline{y} \qquad \text{Equation 2}$$

The norm, $\|\cdot\|$, is expressed in terms of the inner product $$\|\underline{x}\| = \sqrt{\langle \underline{x},\underline{x}\rangle} \qquad \text{Equation 3}$$

The correlation measures the projection of the received vector onto a delayed ideal vector $$\underline{S}.*\underline{Q}(\tau) \qquad \text{Equation 4}$$

where .* is the element-by-element product, and $\underline{Q}(\tau)$ is the delay vector $$\underline{Q}(\tau) = [e^{j2\pi(N/2)\Delta_F \tau} \ldots e^{j2\pi\Delta_F \tau} \ldots e^{-j2\pi(N/2)\Delta_F \tau}]^T \qquad \text{Equation 5}$$

$\Delta_F$ is the frequency domain resolution.

The correction delay $\tau_{max}^k$ corresponding to the peak in the correlation is obtained at each iteration.

$$\tau_{max}^k = \underset{\tau}{\arg\max}\lfloor |\rho^k(\tau)| \rfloor \qquad \text{Equation 6}$$

The super-script on $\underline{R}^k$ indicates the energy in the received signal at delays $\{\tau_{max}^1, \tau_{max}^2, \ldots, \tau_{max}^{k-1}\}$ have been removed. $\underline{R}^k$ evolves according to $$\underline{R}^{k+1} = \underline{R}^k - \frac{\langle \underline{R}^k, \underline{S}.*\underline{Q}(\tau_{max}^k)\rangle}{\|\underline{S}\|_2^2} \cdot \underline{S}.*\underline{Q}(\tau_{max}^k) \qquad \text{Equation 7}$$

Which describes the removal of the energy associated with the ideal signal delayed by $\tau_{max}^k$ from the received signal.

The fine resolution correction is then given by $$\tau_{toa} = \min_{\forall k}\{\tau_{max}^k\} \qquad \text{Equation 8}$$

Figure 6:
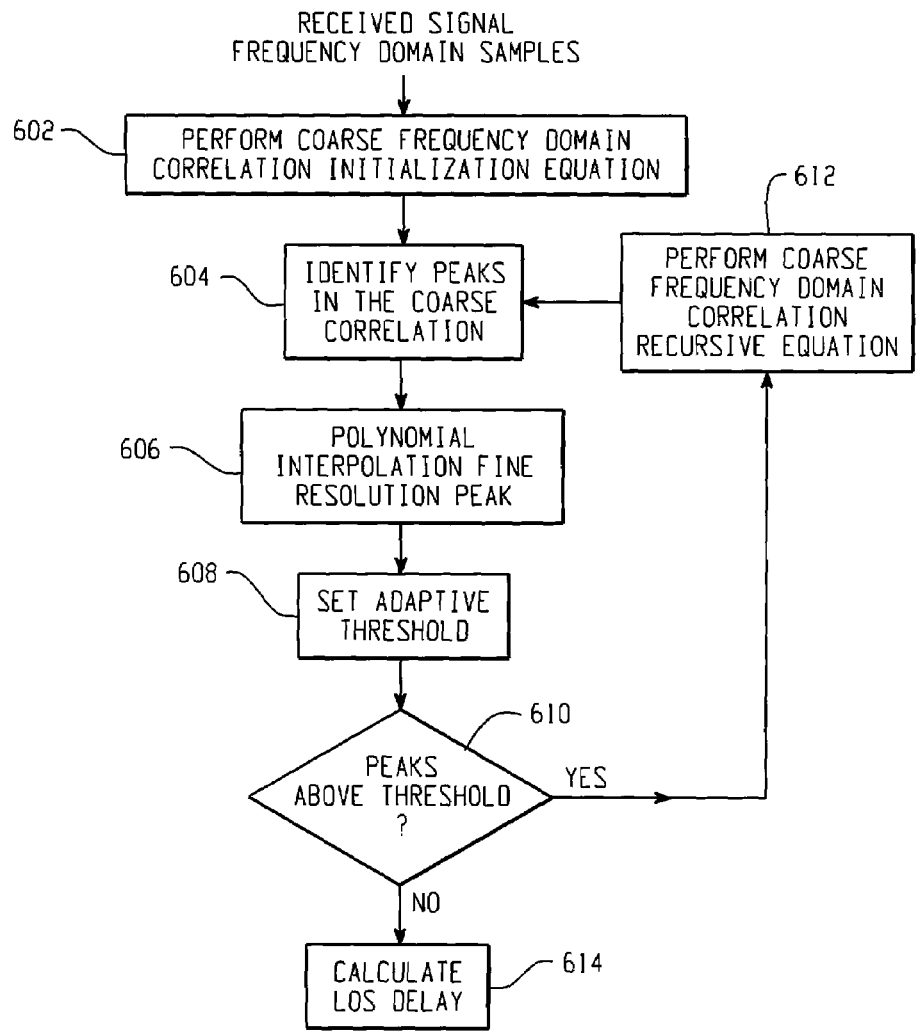
FIG. 6 is an example methodology for determining time of arrival.

An example embodiment that implements these mathematical relationships is depicted in FIG. 6. The received signal is transformed to the frequency domain. This can be accomplished by any means of a hardware or software discrete Fourier transform (DFT) or the fast Fourier transform (FFT) when $N=2^M$ for some integer M.

The coarse frequency domain correlation Equation 1 and the recursive update Equation 7 are combined in a single calculation illustrated by equation 8.

$$\rho^{k+1}(\tau) = \frac{1}{\sqrt{1-\rho^k(\tau_{max}^k)^2}}\left[\rho^k(\tau) - \rho^k(\tau_{max}^k)\frac{\langle \underline{S}.*\underline{Q}(\tau), \underline{S}.*\underline{Q}(\tau_{max}^k)\rangle}{\|\underline{S}\|_2^2}\right] \qquad \text{Equation 9}$$

Since S is a known sequence this formulation lends itself to the following implementation efficiencies. First the magnitude (norm) of S is precalculated. Second the inner product $\langle \underline{S}.*\underline{Q}(\tau), \underline{S}.*\underline{Q}(\tau_{max}^k)\rangle$ is simply the cyclic delayed autocorrelation of S. Thus, the precalculated autocorrelation can be cyclically delayed by $\tau_{max}^k$ to obtain the inner product rather than directly calculating this inner product at each iteration.

Figure 7:
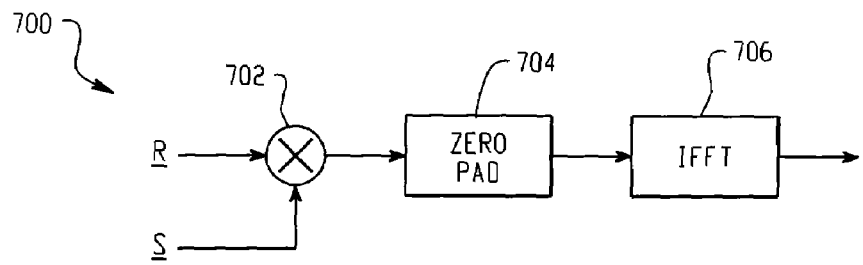
FIG. 7 is an example of a circuit for determining correlation.

Initialization of the recursive algorithm is most efficiently implemented using an inverse FFT (IFFT) as shown in FIG. 7 for the correlation calculated in Equation 1.

The product of R and S is obtained by multiplier 702 and is zero padded by zero pad 704 to obtain the desired level of coarse resolution in the correlation. An inverse Fourier transform is performed on the output of zero pad 704 by IFFT 706. The resolution of the coarse frequency domain correlation update, Equation 7, is also determined by the level of zero padding during initialization.

At this point any level of resolution could be obtained by simply zero padding to the desired level. However, the IFFT is appropriately viewed as trigonometric interpolation of the product R.*S. When the number of successive cancellation iterations is small this is computationally more intensive than a low order polynomial interpolation applied at each successive cancellation iteration. An optimal balance between trigonometric (zero padding) and polynomial interpolation can be determined through experiment or simulation on various multipath channels.

Figure 8:
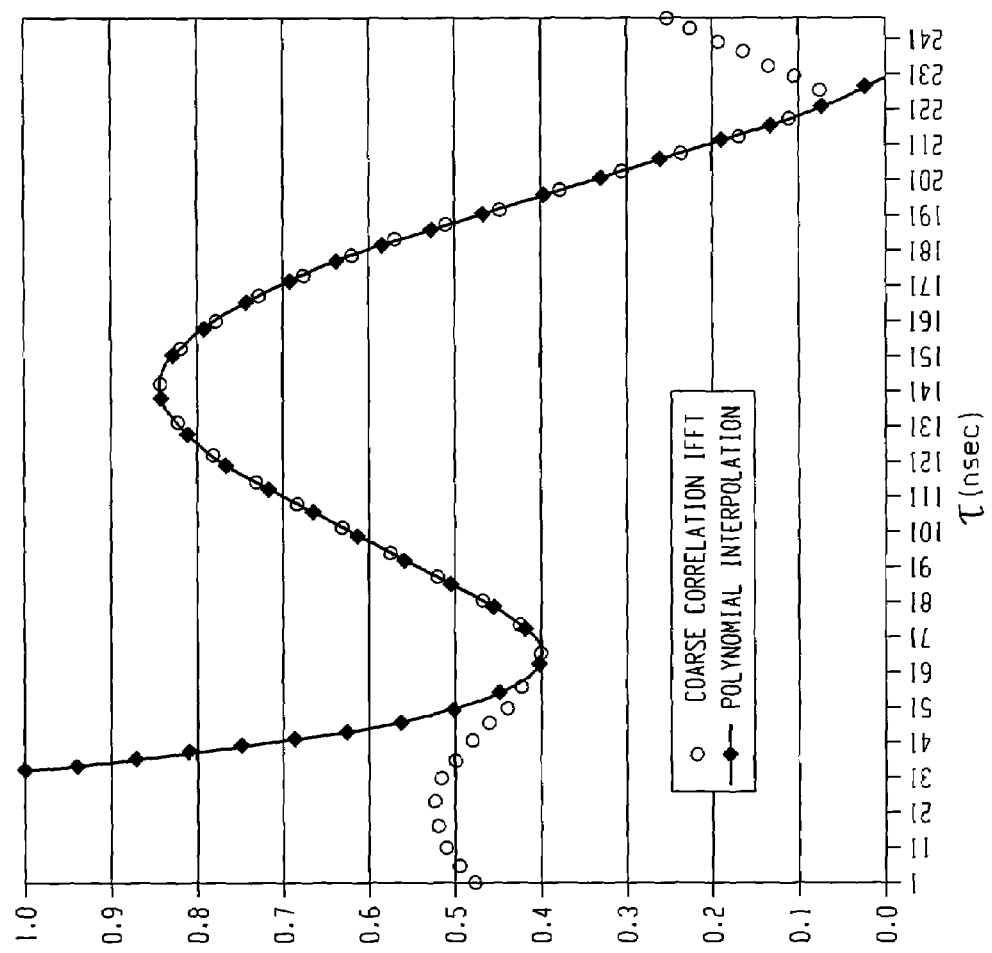
FIG. 8 is an example plot of coarse correlation and fine correlation.
Figure 9:
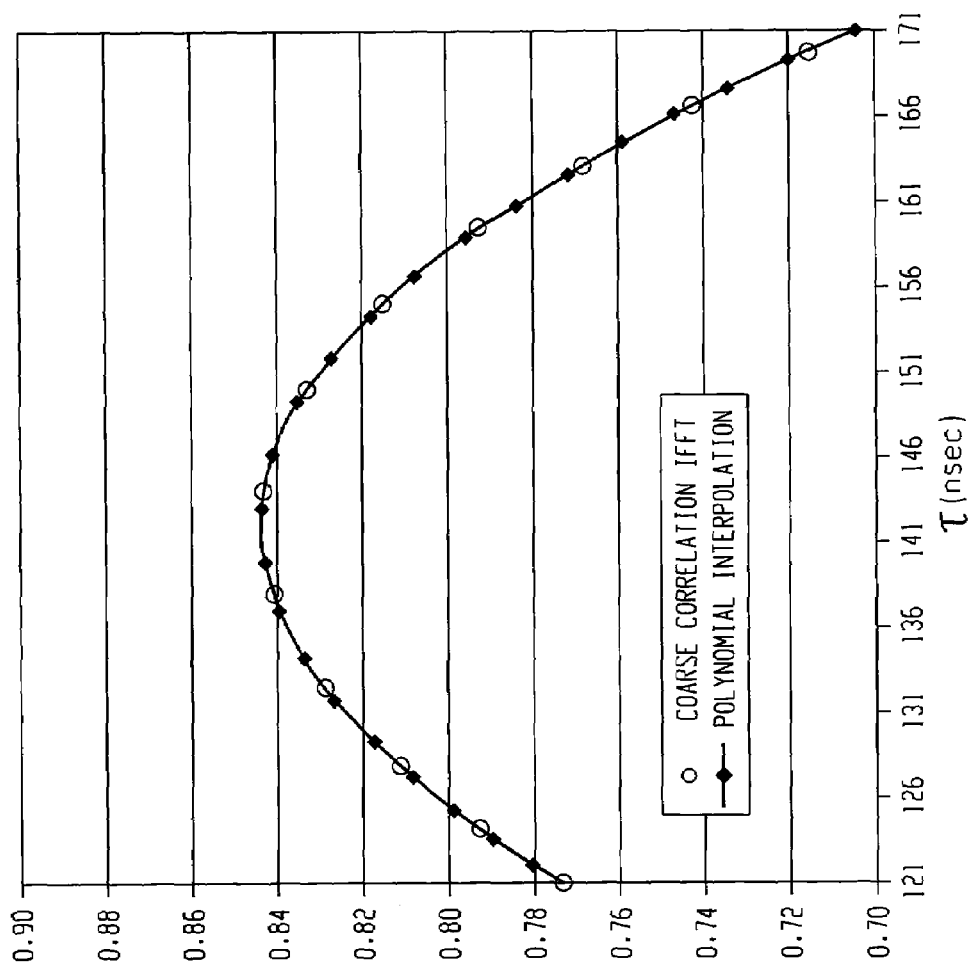
FIG. 9 is an exploded view of coarse and fine correlations illustrated in FIG. 8.

FIGS. 7 and 8 show the output of the coarse correlation (output from IFFT 706) with samples calculated at 5 nsec intervals and the $5^{th}$ order polynomial obtained from the 5 points closest to the peak. If the polynomial values are calculated at 1 nsec intervals it is clear from FIG. 8 that the curve is well represented around the peak. In this example the coarse resolution (5 nsec) correlation estimates the peak at 141 nsec. The fine resolution correlation adjusts this by 1 nsec (1 foot) to 142 nsec. Described herein is an example embodiment of an apparatus for implementing the aforementioned mathematical relationships. Also described herein is a methodology for implementing the aforementioned mathematical relationships.

FIG. 1 is an example embodiment comprising an apparatus 100 configured to determine time of arrival of a wireless signal. Apparatus 100 comprises a wireless transceiver 104 capable of receiving wireless signals via antenna 102. Optionally, wireless transceiver 104 may also be capable sending wireless signals.

Wireless transceiver 104 is configured for performing desired signal processing such as modulation/demodulation, frequency conversion, encryption/decryption, Digital to Analog (D/A), Analog to Digital (A/D), filtering and/or amplifying. In an example embodiment, wireless transceiver 104 employs a Physical Layer processor (PHY) which can be coupled to a D/A and/or A/D converter. A Media Access Controller (MAC) can be coupled to the PHY. The MAC may employ an associated Read Only Memory (ROM) and Random Access Memory (RAM).

A PHY is a physical layer (PHY) processing device (e.g., a modem or digital signal processor). The PHY typically performs digital signal processing, such as analog-to-digital and digital-to-analog conversion, and encoding/decoding of waveforms (modulation/demodulation). The digital signal processing can be done with general purpose digital signal processing integrated circuits, or in specially designed digital logic. In either case, the PHY is modulating/demodulating data to be compatible with the appropriate communication standard. For example, in IEEE 802.11a this involves OFDM, while in IEEE 802.11b it involves Direct Sequence Spread Spectrum (DSSS). On one side of the PHY, data is exchanged with the MAC, while on the other side of PHY, signals are exchanged with RF/BB. A PHY typically includes analog-to-digital (A/D) converters for data received from RF/BB, and digital-to-analog (D/A) converters for data transmitted to RF/BB.

A MAC is a Medium Access Control (MAC) processing system, In an example embodiment the MAC processing system includes a MAC processor (e.g., an embedded processor) which is a multi-functional processor engine responsible for a variety of different processing tasks associated with the wireless communications. The MAC may employ RAM to store data going to and from the PHY. The MAC can act upon data, for example, encrypting or decrypting it, or by interpreting the data and making decisions as to how and when to forward it.

Wireless transceiver 104 is coupled to time of arrival (TOA) logic 106. TOA logic 106 is configured for determining the time of arrival of a wireless signal (e.g. wireless signal 108) received by antenna 102 and processed by wireless transceiver 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Although the example embodiment illustrated in FIG. 1 discloses the time of arrival logic is separate from the wireless transceiver, it is also contemplated in an example embodiment that the time of arrival logic can be implemented within the wireless transceiver. For example a microprocessor can perform the functionality of one or more of a PHY, MAC and TOA logic.

Figure 2:
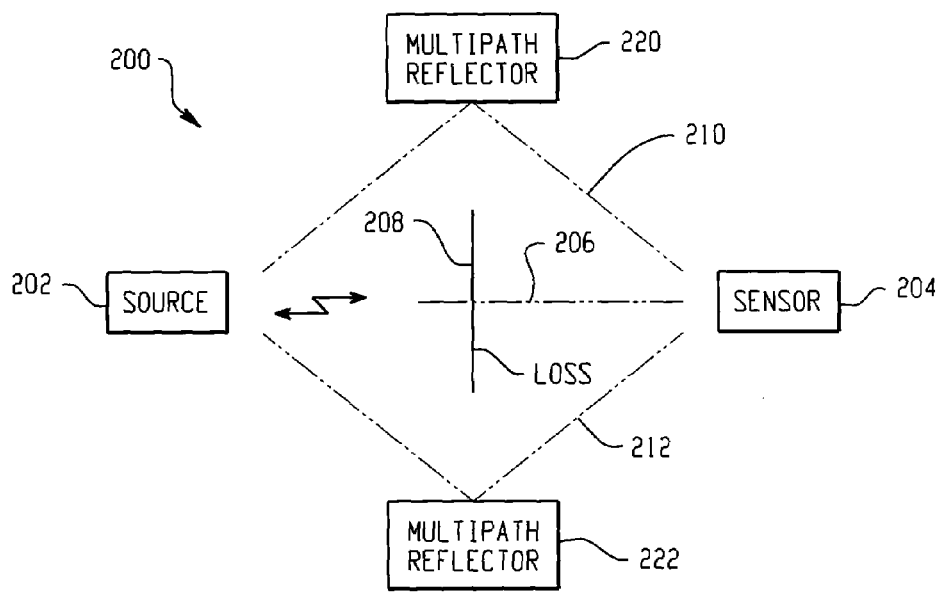
FIG. 2 is an example of a multipath environment.
Figure 3:
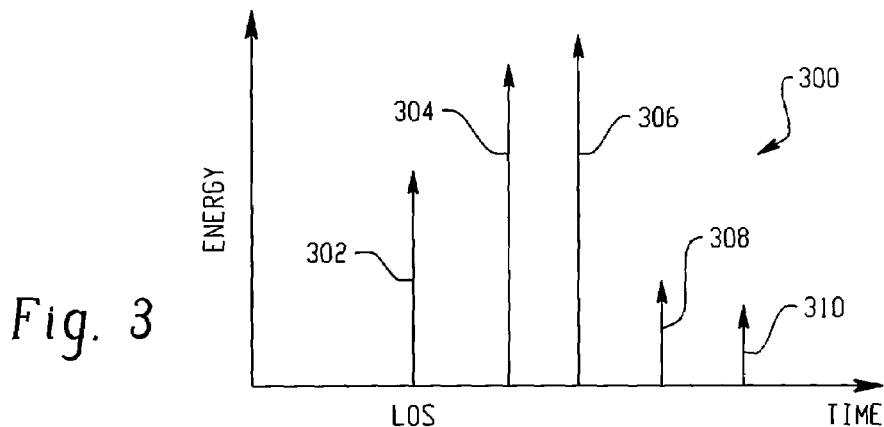
FIG. 3 is an example impulse response plot for received signals in a multipath environment.

FIG. 2 illustrates an example of a signal being sent by a source 202 to a sensor 204 in a multipath environment 200. In the illustrated example, the line of site (LOS) signal 206 passes through a lossy media 208, which causes some signal loss. Sensor 204 also receives signal 210 (a non-line of site "NLOS" signal) that is reflected by a multipath reflector 220 and signal 212 (also a NLOS signal) reflected off of multipath reflector 222. Signals 206, 210, 212 can be illustrated as shown in FIG. 3. In FIG. 3, for example, signal 206 can be represented by impulse signal 302, signals 2120 and 212 by 304, 306 respectively, and 308, 310 can represent other received multipath signals. As will be described herein, TOA logic 106 estimates the TOA of the LOS signal, even though as illustrated in FIG. 3, the LOS signal may be of lower magnitude than reflected NLOS signals.

TOA logic 106 can employ adaptive thresholds and criteria for different modes (e.g. 802.11a/b/g), channel statistics and multi-path complexity. The adaptive threshold can be determined by any one or more of the following factors:

Mode, such as the type of modulation and frequency, for example the 802.11 mode can be one of 11b (CCK/DSSS 2 G), 11a (OFDM 5 G) or 11g (OFDM 2 GHz).

The standard deviation and mean of the correlation coefficients. A larger standard deviation indicates higher multi-path complexity, which should be dealt with by using a smaller threshold.

The number of peaks of correlation coefficients. A larger the number of peaks indicates higher multi-path complexity.

The magnitude difference between the two largest correlation coefficients. If the largest coefficient is very dominant, it is treated as the LOS path.

The range of the time distance from the coarse TOA (referred to herein as Tau or $\tau$) given by a Coarse Resolution Time Domain Correlations (CRTDC). Adjusting the range of Tau will avoid over-tuning and ensure the elimination of non-line-of site (NLOS) interference The stop conditions of iterations. Controlling the number of successive cancellations will avoid over-tuning.

The TOA logic is configured to perform progressive searches (coarse, then finer) for finding the maximum correlation. Correlation coefficients can be calculated at a coarse scale (e.g. every M nanoseconds where M is the desired coarse time period, such as the sampling rate). After determining the maximum coarse correlation coefficient, TOA logic 106 calculates finer coefficients near the maximum coarse correlation coefficient and determines the final maximum finer coefficient.

TOA logic 106 uses polynomial interpolation instead of FFT in the finer search to calculate the finer correlation coefficients. For example, to acquire M finer coefficients, TOA logic 106 does not calculate the finer correlation coefficients by doing correlation, but instead estimates the finer correlation coefficients by using polynomial interpolation based on the previous coarse scale values.

TOA logic 106 can be configured to use a direct algorithm to calculate successive correlation coefficients instead of cancellation and correlation in the coarse searches. The direct algorithm only uses correlation to calculate those coarse scale coefficients for the first iteration. After the first iteration, subsequent iterations calculate subsequent coarse scale coefficients directly from previous data, eliminating the need for explicit cancellation (see e.g. equation 6 described herein supra). The formula for the algorithm is:

In an example embodiment, TOA logic 106 implements the algorithm using fixed point math instead of floating point. Using fixed point math will improve the processing speed of the algorithm.

In an example embodiment, TOA logic 106 receives (or calculates) the FFT coefficients of Ideal Samples (e.g. transformed samples of known symbols such as the SFD or long symbol for the packet), and the Actual Samples received from wireless transceiver 104. In an example embodiment, TOA logic 106 also receives the sample rate of the ADC for the actual samples and a coarse TOA. TOA logic 106 by implementing the algorithm described herein will output a finer TOA.

For example, an initial coarse-scale frequency domain correlation is performed on shifted ideal samples with the actual samples. In an example embodiment, actual samples received by a wireless transceiver are transformed into the frequency domain. In an example embodiment, FFT is employed to transfer the actual samples to the frequency domain. This initial correlation is the correlation illustrated in equation 1:

$$\rho^k(\tau) = \frac{\langle \underline{R}^k, \underline{S} \ast \underline{Q}(\tau) \rangle}{\|\underline{R}^k\| \cdot \|\underline{S}\|}.$$

Figure 4:
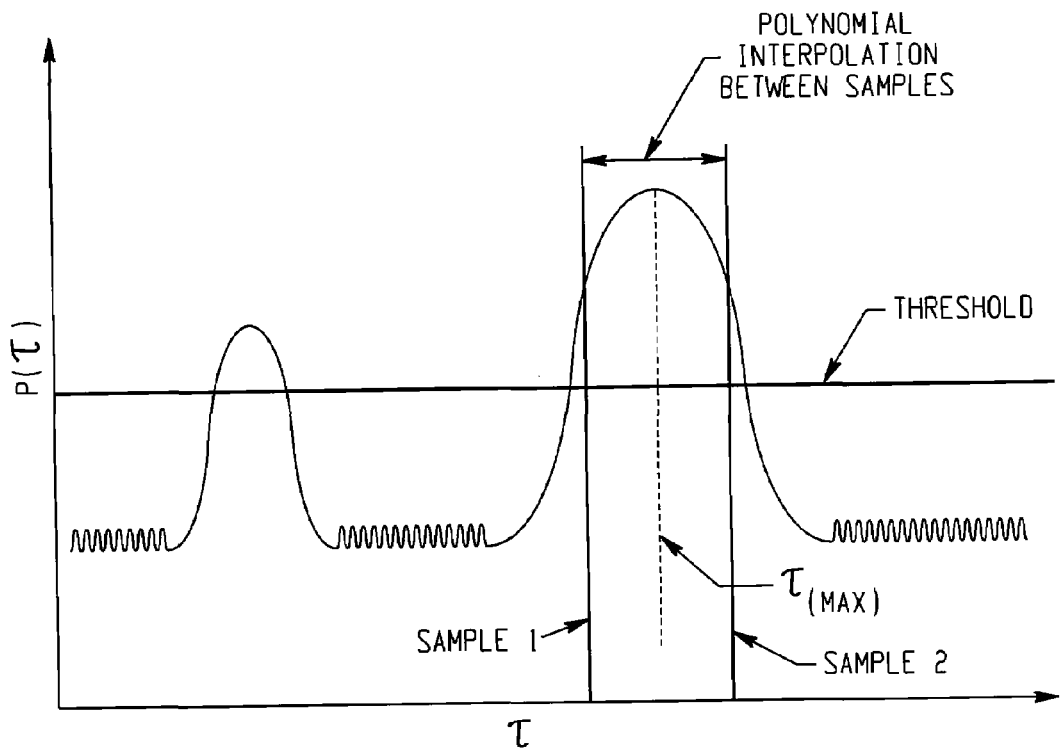
FIG. 4 is an example plot of correlation coefficients of actual samples against time shifted ideal samples.

FIG. 4 illustrates an example result of a correlation between shifted ideal samples with actual samples. The peaks in FIG. 4 are indicative of values of τ which show a high correlation between the shifted ideal samples and actual samples. Multiple peaks indicate a multi-path environment, the larger the number of peaks, the higher the multi-path complexity. In an example embodiment, a circuit similar to the circuit illustrated in FIG. 7 can be utilized to perform the coarse frequency domain initialization equation. It should be noted that the amount of zero padding added by Zero Pad 704 determines the resolution of the initial coarse frequency resolution as well as the resolution of subsequent iterations.

TOA logic 106 is configured to identify peaks in the coarse scale frequency correlation. The peaks of curves above the threshold value are identified. The maximum peak is identified. In an example embodiment the second highest is also identified for reasons that will be described herein.

TOA logic 106 performs Interpolation to determine a fine resolution peak. In an example embodiment, the interpolation is performed on a range around the highest peak identified at 604. In an example embodiment polynomial interpolation is used. Polynomial interpolation can be applied in a variety of ways consistent with this design. As discussed herein previously the correlation values could be calculated directly at a finer resolution in the vicinity of the peak. Neville's algorithm [J. Stoer and R., "Introduction to Numerical Analysis $2^{nd}$ Edition," pp. 40-43] is a common method of calculating the interpolated values. Alternately, the polynomial coefficients could be obtained and used to calculate the peak by solving for the roots of the derivative. The roots are solved for either numerically or analytically. Application of Newton's method will rapidly converge to the solution, and is suited for higher order polynomial interpolation. Direct calculation of the roots is easily obtained for lower order polynomials (order=<3). All of these approaches are consistent with this fine resolution time stamp algorithm.

TOA logic 106 is further configured to adjust an adaptive threshold. The adaptive threshold is set to improve estimation accuracy. Several adaptive mechanisms can be employed to improve estimation accuracy. For example, for an 802.11 compatible system, different criteria for the threshold can be specified for each corresponding to the 802.11 mode, e.g. 11b (CCK/DSSS, 2G), 11a (OFDM, 5g) or 11g (OFDM, 2g) since these modes have different behavior.

In an example embodiment, for each of the aforementioned modes:

an adaptive threshold is set for detecting a maximum in the cross correlation as a multipath component at each iteration.

The relative delay sweep range is set to avoid overtuning and adjusted to ensure the LOS component is estimated.

The dominance of the cross correlation peak is measured.

The iteration stop condition can be determined empirically for the channel and modulation types.

The adaptive threshold is set to determine whether the maximum correlation corresponds to a multipath signal component, the result of noise or correlation side-bands. The adaptive threshold for detecting a maximum as a multipath component is determined by several measures. The standard deviation (std_p_fine) and mean (mean_p_fine) of the correlation coefficients are used to indicate the multipath complexity. Compared with the mean, the larger the standard deviation, the higher the multipath complexity. A threshold is defined for each mode. If the standard deviation is larger than the mean multiplied by that threshold, a smaller correlation threshold is used for the next iteration. The number of peaks in the cross correlation is an indicator of the multipath complexity. The larger the number is, the higher the multipath complexity. A threshold of number of peaks is defined for each mode. If the number of peaks is larger than this threshold, a smaller threshold should be used for next iteration.

In addition, the finer resolution algorithm searches real LOS SOP within a certain range around the SOP given by the CRTDC. This range is defined as the interval of τ. It is initially set to small one to save computation and avoid over-tuning. In the case that the first correlation coefficient is close to the maximum peak, it is necessary to extend the left border of τ further to find the possibly missing LOS candidate. A threshold and a constant step are defined for this. If the first correlation coefficient is larger than the maximum peak multiplied by this threshold, the left border of τ is extended to the left by that constant step.

After adjusting the adaptive threshold, TOA logic 106 determines whether there are any peaks remaining above the adaptive threshold. If there are peaks above the threshold, a subsequent iteration is performed. For the subsequent iteration, a course frequency domain calculation is performed using the recursive equation given by $$\rho^{k+1}(\tau) = \frac{1}{\sqrt{1-\rho^k(\tau_{\max}^k)^2}} \left[ \rho^k(\tau) - \rho^k(\tau_{\max}^k) \frac{\langle \underline{S} \ast \underline{Q}(\tau), \underline{S} \ast \underline{Q}(\tau_{\max}^k) \rangle}{\|\underline{S}\|_2^2} \right]$$

as explained herein supra.

After performing the recursive calculation, TOA logic 106 uses the results to identify peaks, interpolate and set the adaptive threshold as described herein.

If TOA logic 106 determines there are no peaks above the adaptive threshold the line-of-site delay is calculated. The line of site is calculated by determining from the values of the maximum fine correlation peaks calculated during each iteration, e.g. $\{\tau_{max}^1, \tau_{max}^2, \ldots, \tau_{max}^{k-1}\}$ the maximum fine correlation peak that corresponds to the minimum time delay, or $$\tau_{toa} = \min_{\forall k}\{\tau^k_{\max}\}.$$

However, there are some circumstances even if there are peaks above the threshold subsequent iterations will not be performed. For example, the magnitude difference between the two largest peaks is an indicator of the dominance of the maximum peak. A threshold can be defined to quantify the dominance. Therefore in an example embodiment, if the maximum peak is larger than the second maximum peak multiplied by that threshold (the threshold to quantify dominance), it is thought to be very dominant and treated as the LOS path, given other criteria are satisfied. Therefore, further iterations are not needed and processing goes directly to 614.

In addition, too many iterations will ruin the result by either noise or the accumulated errors of the method implementing the algorithm. So a control can be placed on the total number of iterations. An empirical threshold is defined to constrain the number of iterations. If the total number of iteration is larger than this threshold and the standard deviation of the correlation coefficients is not larger than the mean (which means the multi-path complexity of the remaining samples is low), the algorithm will stop and TOA logic 106 take the best result available as the final.

Figure 5:
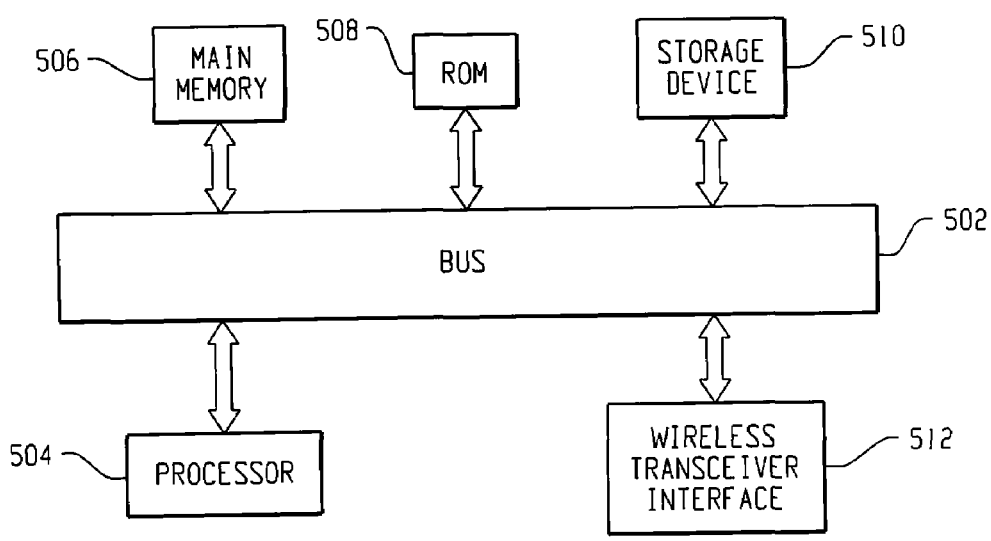
FIG. 5 is an example of a computer system for implementing a time of arrival algorithm.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 410, such as a magnetic disk or optical disk, is provided and coupled to bus 502 for storing information and instructions.

An example embodiment of the invention is related to the use of computer system 500 for determining time of arrival of a wireless signal. According to one embodiment of the invention, determining time of arrival of a wireless signal is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Computer system 500 also includes a wireless transceiver interface 512 coupled to bus 502. Wireless transceiver interface 512 provides a two-way data communication coupling processor 504 to a wireless transceiver (not shown, e.g. wireless transceiver 104 (FIG. 1). This enables processor 504 to acquire data about signals received by wireless transceiver 512 for determining time of arrival of the signals.

In view of the foregoing structural and functional features described above, a methodology 600 in accordance with various aspects of the present invention will be better appreciated with reference to FIG. 6. While, for purposes of simplicity of explanation, the methodology 600 of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement methodology 600. Embodiments of the present invention are suitably adapted to implement the methodology in hardware, software, or a combination thereof.

At 602, an initial coarse-scale frequency domain correlation is performed on shifted ideal samples with the actual samples. In an example embodiment, actual samples received by a wireless transceiver are transformed into the frequency domain. In an example embodiment, FFT is employed to transfer the actual samples to the frequency domain. This initial correlation is the correlation illustrated in equation 1:

$$\rho^k(\tau) = \frac{\langle \underline{R}^k, \underline{S}.*\underline{Q}(\tau)\rangle}{\|\underline{R}^k\|\cdot\|\underline{S}\|}.$$

FIG. 4 illustrates an example result of a correlation between shifted ideal samples with actual samples. The peaks in FIG. 4 are indicative of values of TAU which show a high correlation between the shifted ideal samples and actual samples. Multiple peaks indicate a multi-path environment, the larger the number of peaks, the higher the multi-path complexity. In an example embodiment, a circuit similar to the circuit illustrated in FIG. 7 can be utilized to perform the coarse frequency domain initialization equation. It should be noted that the amount of zero padding added by Zero Pad 704 determines the resolution of the initial coarse frequency resolution as well as the resolution of subsequent iterations.

At 604, peaks in the coarse scale frequency correlation are identified. The peaks of curves above the threshold value are identified. The maximum peak is identified. In an example embodiment the second highest is also identified for reasons that will be described herein.

At 606, interpolation is performed to determine a fine resolution peak. In an example embodiment, the interpolation is performed on a range around the highest peak identified at 604. In an example embodiment polynomial interpolation is used. Polynomial interpolation can be applied in a variety of ways consistent with this design. As discussed herein previously the correlation values could be calculated directly at a finer resolution in the vicinity of the peak. Neville's algorithm [J. Stoer and R., "Introduction to Numerical Analysis $2^{nd}$ Edition," pp. 40-43] is a common method of calculating the interpolated values. Alternately, the polynomial coefficients could be obtained and used to calculate the peak by solving for the roots of the derivative. The roots are solved for either numerically or analytically. Application of Newton's method will rapidly converge to the solution, and is suited for higher order polynomial interpolation. Direct calculation of the roots is easily obtained for lower order polynomials (order=<3). All of these approaches are consistent with this fine resolution time stamp algorithm.

At 608, the adaptive threshold is set. The adaptive threshold is set to improve estimation accuracy. Several adaptive mechanisms can be employed to improve estimation accuracy. For example, a system setup or calibration can be used to determine and set the initial thresholds. The system devices are placed at known locations and the initial thresholds are adjusted to provide best accuracy. Alternately, the initial thresholds could be set by applying past general knowledge of certain deployment areas such as an office or large open space warehouse. These could have initial values applied to all such types of spaces that were determined empirically or by simulation. For an 802.11 compatible system, different criteria for the threshold can be specified for each corresponding to the 802.11 mode, e.g. 11b (CCK/DSSS, 2G), 11a (OFDM, 5g) or 11g (OFDM, 2g) since these modes have different behavior.

In an example embodiment, for each of the aforementioned modes:

- an adaptive threshold is set for detecting a maximum in the cross correlation as a multipath component at each iteration.
- The relative delay sweep range is set to avoid overtuning and adjusted to ensure the LOS component is estimated.
- The dominance of the cross correlation peak is measured.
- The iteration stop condition can be determined empirically for the channel and modulation types.

The adaptive threshold is set to determine whether the maximum correlation found at step 606 corresponds to a multipath signal component, the result of noise or correlation side-bands. The adaptive threshold for detecting a maximum as a multipath component is determined by several measures. The standard deviation (std_p_fine) and mean (mean_p_fine) of the correlation coefficients are used to indicate the multipath complexity. Compared with the mean, the larger the standard deviation, the higher the multipath complexity. A threshold is defined for each mode. If the standard deviation is larger than the mean multiplied by that threshold, a smaller correlation threshold is used for the next iteration. The number of peaks in the cross correlation is an indicator of the multipath complexity. The larger the number is, the higher the multipath complexity. A threshold of number of peaks is defined for each mode. If the number of peaks is larger than this threshold, a smaller threshold should be used for next iteration.

In addition, the finer resolution algorithm searches real LOS SOP within a certain range around the SOP given by the CRTDC. This range is defined as the interval of $\tau$. It is initially set to small one to save computation and avoid over-tuning. In the case that the first correlation coefficient is close to the maximum peak, it is necessary to extend the left border of $\tau$ further to find the possibly missing LOS candidate. A threshold and a constant step are defined for this. If the first correlation coefficient is larger than the maximum peak multiplied by this threshold, the left border of $\tau$ is extended to the left by that constant step.

At 610, it is determined whether there are any peaks remaining above the adaptive threshold. If there are peaks above the threshold (YES), then, at 612, a coarse frequency domain calculation is performed using the recursive equation given by $$\rho^{k+1}(\tau) = \frac{1}{\sqrt{1-\rho^k(\tau_{\max}^k)^2}}\left[\rho^k(\tau) - \rho^k(\tau_{\max}^k)\frac{\langle \underline{S}_* * Q(\tau), \underline{S}_* * Q(\tau_{\max}^k)\rangle}{\|S\|_2^2}\right]$$

as explained herein supra. Steps 604, 606, 608, 610 will be repeated using the results of the coarse frequency domain calculation acquired with the recursive equation.

If at 610, it is determined there are no peaks above the adaptive threshold (NO) then at 614 the line-of-site delay is calculated. The line of site is calculated by determining from the values of the maximum fine correlation peaks calculated during each iteration, e.g. $\{\tau_{max}^1, \tau_{max}^2, \ldots, \tau_{max}^{k-1}\}$ the maximum fine correlation peak that corresponds to the minimum time delay, or $$\tau_{toa} = \min_{\forall k}\{\tau_{\max}^k\}.$$

However, there are some circumstances at 610 when even if there are peaks above subsequent iterations will not be performed, thus processing will proceed to 614 instead of 612. For example, the magnitude difference between the two largest peaks is an indicator of the dominance of the maximum peak. A threshold can be defined to quantify the dominance. Therefore in an example embodiment, if the maximum peak is larger than the second maximum peak multiplied by that threshold (the threshold to quantify dominance), it is thought to be very dominant and treated as the LOS path, given other criteria are satisfied. Therefore, further iterations are not needed and processing goes directly to 614.

In addition, too many iterations will ruin the result by either noise or the accumulated errors of the method implementing the algorithm. So a control can be placed on the total number of iterations. An empirical threshold is defined to constrain the number of iterations. If the total number of iteration is larger than this threshold and the standard deviation of the correlation coefficients is not larger than the mean (which means the multi-path complexity of the remaining samples is low), the algorithm will stop and at 614 take the best result available as the final.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a wireless transceiver operable to receive a wireless signal;
   a time of arrival circuit coupled to the wireless transceiver configured to determine a time of arrival for the wireless signal;
   wherein the time of arrival circuit is operative to perform a coarse-scale frequency domain correlation of the actual samples converted to a frequency domain with a predetermined ideal sample to obtain a plurality of coarse correlation coefficients;
   wherein the time delay circuit is operative to locate a peak coarse correlation coefficient from the plurality of coarse correlation coefficients;
   wherein the time delay circuit is operative to determine a plurality of fine correlation coefficients by interpolating around the peak coarse correlation coefficient;
   wherein the time of arrival circuit determines a maximum correlation coefficient from the plurality of fine correlation coefficients and a time delay associated with the maximum correlation coefficient, and
   wherein the time of arrival circuit determines the time of arrival based on the time delay associated with the maximum correlation coefficient.

2. An apparatus according to claim 1, the time of arrival circuit is operative to calculate finer resolution correlation coefficients around the peak coarse correlation coefficient by polynomial interpolation.

3. An apparatus according to claim 1, the time of arrival circuit is operative to calculate finer resolution correlation coefficients by solving for roots of a derivative.

4. An apparatus according to claim 1, the time of arrival circuit is operative to determine whether the maximum correlation coefficient meets a predefined criteria.

5. An apparatus according to claim 4, wherein the predefined criteria is an adaptive threshold, the time of arrival circuit is operative to adjust the adaptive threshold responsive to the maximum finer resolution coefficient not meeting the predefined criteria.

6. An apparatus according to claim 5, wherein the time of arrival circuit is operative select a smaller value for the adaptive threshold responsive to a standard deviation of the plurality of coarse coefficients is larger than the mean of the plurality of coarse correlation coefficients multiplied by the adaptive threshold.

7. An apparatus according to claim 5, wherein the predefined criteria is a number of peaks exceeding the adaptive threshold, the time of arrival circuit is responsive to select a smaller value for the adaptive threshold responsive to the number of peaks exceeding a predetermined number.

8. An apparatus according to claim 4, wherein the time of arrival circuit is responsive to perform a subsequent iteration responsive to the maximum correlation coefficient not meeting the predefined criteria, the subsequent iteration comprising:
   calculating a second set of coarse correlation coefficients, the calculating the second set of correlation coefficients comprises removing energy associated with the ideal sample delayed by the time delay associated with the maximum correlation coefficient;
   locating a second peak coarse correlation coefficient from the second set of coarse correlation coefficients;
   determining a second plurality of fine correlation coefficients by interpolating around the second peak coarse correlation coefficient;
   determining a second maximum correlation coefficient from the plurality of fine correlation coefficients and a time delay associated with the second maximum correlation coefficient; and
   determining the time of arrival based on the shortest time delay selected from the group consisting of the time delay associated with the first maximum correlation coefficient and the time delay associated with the second maximum correlation coefficient.

9. An apparatus according to claim 4, wherein the time of arrival circuit is responsive to perform a plurality subsequent iterations responsive to the maximum correlation coefficient not meeting the predefined criteria, the subsequent iterations comprising:
   calculating subsequent coarse correlation coefficients, the calculating the correlation coefficients comprises removing energy associated with the ideal sample delayed by the time delay associated with a maximum correlation coefficient of a preceding iteration;
   locating a subsequent peak coarse correlation coefficient from the subsequent set of coarse correlation coefficients;
   determining a subsequent plurality of fine correlation coefficients by interpolating around the subsequent peak coarse correlation coefficient;
   determining a subsequent maximum correlation coefficient from the subsequent plurality of fine correlation coefficients and a time delay associated with the second maximum correlation coefficient; and
   determining the time of arrival based on the shortest time delay selected from the group consisting of the time delay associated with the first maximum correlation coefficient and the time delay associated with each of the subsequent maximum correlation coefficients.

10. An apparatus according to claim 9, the time of arrival circuit is operable to stop the plurality of iterations responsive to exceeding a preset number of iterations and a mean of the subsequent plurality of coarse correlation coefficients is greater than a standard deviation of the subsequent plurality of coarse correlation coefficients.

11. An apparatus according to claim 1, wherein the frequency domain conversion comprises a fast fourier transform.

12. An apparatus according to claim 1, wherein the predetermined ideal sample is selected from one of a group consisting of synchronization bits and a start frame delimiter.

13. A method for determining a time of arrival of a signal, comprising:
    receiving the signal;
    performing a coarse-scale frequency domain correlation of actual samples of the received signal converted to a frequency domain with a predetermined ideal sample to obtain a plurality of coarse correlation coefficients;
    determining a peak coarse correlation coefficient from the plurality of coarse correlation coefficients;
    interpolating around the peak coarse correlation coefficient to obtain a plurality of fine correlation coefficients;
    determining a maximum correlation coefficient from the plurality of fine correlation coefficients and a time delay associated with the maximum correlation coefficient, and
    determining the time of arrival of the received signal based on the time delay associated with the maximum correlation coefficient.

14. A method according to claim 13, the interpolating is performed by a polynomial interpolation.

15. A method according to claim 13, further comprising determining whether the maximum correlation coefficient meets a predefined criteria.

16. A method according to claim 15, wherein the predefined criteria is an adaptive threshold, the method further comprising adjusting the adaptive threshold responsive to the maximum finer resolution coefficient not meeting the predefined criteria.

17. A method according to claim 15, further comprising performing a subsequent iteration responsive to the maximum correlation coefficient not meeting the predefined criteria, the subsequent iteration comprising:
   calculating a second set of coarse correlation coefficients, the calculating the second set of correlation coefficients comprises removing energy associated with the ideal sample delayed by the time delay associated with the maximum correlation coefficient;
   locating a second peak coarse correlation coefficient from the second set of coarse correlation coefficients;
   determining a second plurality of fine correlation coefficients by interpolating around the second peak coarse correlation coefficient;
   determining a second maximum correlation coefficient from the plurality of fine correlation coefficients and a time delay associated with the second maximum correlation coefficient; and
   determining the time of arrival based on the shortest time delay selected from the group consisting of the time delay associated with the first maximum correlation coefficient and the time delay associated with the second maximum correlation coefficient.

18. A method according to claim 13, further comprising performing a plurality subsequent iterations responsive to the maximum correlation coefficient not meeting the predefined criteria, the subsequent iterations comprising:
   calculating subsequent coarse correlation coefficients, the calculating the correlation coefficients comprises removing energy associated with the ideal sample delayed by the time delay associated with a maximum correlation coefficient of a preceding iteration;
   locating a subsequent peak coarse correlation coefficient from the subsequent set of coarse correlation coefficients;
   determining a subsequent plurality of fine correlation coefficients by interpolating around the subsequent peak coarse correlation coefficient;
   determining a subsequent maximum correlation coefficient from the subsequent plurality of fine correlation coefficients and a time delay associated with the second maximum correlation coefficient; and
   determining the time of arrival based on the shortest time delay selected from the group consisting of the time delay associated with the first maximum correlation coefficient and the time delay associated with each of the subsequent maximum correlation coefficients.

19. An apparatus for determining a time of arrival of a signal, comprising:
   means for receiving the signal;
   means for performing a coarse-scale correlation of actual samples of the received signal converted to a frequency domain with a predetermined ideal sample to obtain a plurality of coarse correlation coefficients;
   means for determining a peak coarse correlation coefficient from the plurality of coarse correlation coefficients;
   means for interpolating around the peak coarse correlation coefficient to obtain a plurality of fine correlation coefficients;
   means for determining a maximum correlation coefficient from the plurality of fine correlation coefficients and a time delay associated with the maximum correlation coefficient, and
   means for determining the time of arrival of the received signal based on the time delay associated with the maximum correlation coefficient.

20. An apparatus according to claim 19, further comprising means for determining whether the maximum correlation coefficient exceeds a predetermined threshold;
   means for performing a subsequent iteration responsive to the maximum correlation coefficient not meeting the predefined criteria, the means for performing a subsequent iteration comprising:
   means for calculating a second set of coarse correlation coefficients, the calculating the second set of correlation coefficients comprises removing energy associated with the ideal sample delayed by the time delay associated with the maximum correlation coefficient;
   means for locating a second peak coarse correlation coefficient from the second set of coarse correlation coefficients;
   means for determining a second plurality of fine correlation coefficients by interpolating around the second peak coarse correlation coefficient;
   means for determining a second maximum correlation coefficient from the plurality of fine correlation coefficients and a time delay associated with the second maximum correlation coefficient; and
   means for determining the time of arrival based on the shortest time delay selected from the group consisting of the time delay associated with the first maximum correlation coefficient and the time delay associated with the second maximum correlation coefficient.

* * * * *